US012519321B2

(12) United States Patent
Lee et al.

(10) Patent No.: US 12,519,321 B2
(45) Date of Patent: Jan. 6, 2026

(54) SMART BATTERY, CHARGER AND BATTERY CHARGING SYSTEM

(71) Applicant: TECHTRONIC CORDLESS GP, Anderson, SC (US)

(72) Inventors: Hei Man Lee, Kwai Chung (CN); Hai Lian, Guangdong (CN); Dianwu Xu, Guangdong (CN)

(73) Assignee: TECHTRONIC CORDLESS GP, Anderson, SC (US)

( * ) Notice: Subject to any disclaimer, the term of this patent is extended or adjusted under 35 U.S.C. 154(b) by 967 days.

(21) Appl. No.: 17/767,303

(22) PCT Filed: Sep. 16, 2019

(86) PCT No.: PCT/CN2019/105973
§ 371 (c)(1),
(2) Date: Apr. 7, 2022

(87) PCT Pub. No.: WO2021/051238
PCT Pub. Date: Mar. 25, 2021

(65) Prior Publication Data
US 2022/0407319 A1    Dec. 22, 2022

(51) Int. Cl.
*H02J 7/00*      (2006.01)
*H01M 10/42*     (2006.01)
*H04L 9/08*      (2006.01)

(52) U.S. Cl.
CPC ..... *H02J 7/00036* (2020.01); *H01M 10/4257* (2013.01); *H02J 7/0031* (2013.01); *H04L 9/0819* (2013.01); *H01M 2010/4271* (2013.01)

(58) Field of Classification Search
USPC ...................................................... 320/106
See application file for complete search history.

(56) References Cited

U.S. PATENT DOCUMENTS 7,667,429 B2     2/2010  Little
2005/0001589 A1  1/2005  Edington
(Continued)

FOREIGN PATENT DOCUMENTS

CN    101164192 A    4/2008
CN    101809841 A    8/2010
(Continued)

OTHER PUBLICATIONS

Machine translation of CN109606201 (Year: 2019).*
(Continued)

*Primary Examiner* — Samuel Berhanu
(74) *Attorney, Agent, or Firm* — Dority & Manning, P.A.

(57) ABSTRACT

In a battery charging system (100), a charger (110) and a smart battery (160) enhance safety in recharging a cell (180) in the smart battery (160) by a power supply (130) of the charger (110). The smart battery (160) is communicable with the charger (110). If a communication failure occurs, the charger (110) disconnects the power supply (130) from the smart battery (160). The smart battery (160) and the charger (110) share the same symmetric encryption key for encrypting and decrypting message data, allowing one party to determine if the other part is an authentic one. When the smart battery (160) finds that the charger (110) is not authentic, or vice versa, the power supply (130) and the cell (180) are disconnected. When the smart battery (160) finds that a no-charging condition occurs due to abnormality in the cell (180), the smart battery (160) requests the charger (110) to stop charging, and also disconnects the cell (180) from the charger (110) even if the charger (110) fails to stop charging the smart battery (160).

21 Claims, 5 Drawing Sheets

(56) References Cited

U.S. PATENT DOCUMENTS

| | | |
|---|---|---|
| 2006/0208850 A1 | 9/2006 | Ikeuchi |
| 2007/0214293 A1 | 9/2007 | Gangstoe et al. |
| 2014/0210405 A1* | 7/2014 | Yang .................... H02J 7/0044 |
| | | 320/108 |
| 2014/0306660 A1* | 10/2014 | Suzuki ................. H02J 7/0045 |
| | | 320/110 |
| 2019/0089019 A1* | 3/2019 | Lee ................... H01M 10/4285 |

FOREIGN PATENT DOCUMENTS

| | | |
|---|---|---|
| CN | 109638914 A | 4/2019 |
| JP | 2009272134 A * | 11/2009 |
| WO | WO2018056273 A1 | 3/2018 |

OTHER PUBLICATIONS

Machine Translation of CN 1351673 (Year: 2004).*
TTI (Macao Commercial Offshore) Limited; International Patent Application No. PCT/CN2019/105973; International Search Report; Jun. 15, 2020; (2 pages).
European Search Report Corresponding with Application No. EP19946125 on May 8, 2023 (2 pages).

* cited by examiner

SMART BATTERY, CHARGER AND BATTERY CHARGING SYSTEM

This application is a National Stage Patent Application of PCT/CN2019/105973, filed on Sep. 16, 2019, the disclosure of which is incorporated by reference herein in its entirety.

ABBREVIATIONS

AC Alternating current.
AES Advanced Encryption Standard.
AFE Analog front end.
BMS Battery management system.
DC Direct current.
IC Integrated circuit.
MOSFET Metal-oxide-semiconductor field-effect transistor.
UART Universal Asynchronous Receiver-Transmitter.

TECHNICAL FIELD

The present disclosure relates to a smart battery and a charger for charging the smart battery, where the smart battery and the charger form a battery charging system.

BACKGROUND

High-power rechargeable batteries are indispensable in supplying electrical power to power tools, such as trimmers, mowers, chainsaws, vacuum cleaners and electric drills. Some high-power batteries are capable of driving the power tools with a high current at a high voltage, e.g., a current of 10 A delivered at a voltage of 40V. Due to high energy capacities of these batteries, safety in recharging these batteries is of paramount importance. Usually, these batteries are smart batteries. In a smart battery, a BMS is installed to monitor charging and discharging of an electrical cell installed in the smart battery. Typically, the smart battery is also equipped with a communication interface, such as a UART interface, for communicating with an external device, such as a battery charger.

It is desirable to have a charger for charging the smart battery, where the charger is additionally configured to ensure operational safety in charging the smart battery. It is also desirable that the smart battery is additionally configured to work with the charger in enhancing the operational safety. The smart battery and the charger together form a battery charging system.

SUMMARY

A first aspect of the present disclosure is to provide a charger for charging a smart battery.

The charger comprises a power supply, a charger-side on-off switch and a charger-side processor. The charger-side on-off switch is used for electrically connecting or disconnecting the power supply from the smart battery such that electrical power supplied by the power supply is controllably receivable by the smart battery for charging. The charger-side processor is used for controlling the charger-side on-off switch. The charger-side processor is communicable with the smart battery and is configured to execute a charging-control process.

In certain embodiments of the charging-control process, the smart battery is regularly requested to respond to the charger. Responsive to determining that the smart battery does not respond to the charger after the charger requests the smart battery to respond, the charger-side processor determines that a communication failure occurs. Responsive to finding that the communication failure occurs, the charger-side on-off switch is switched off so as to disconnect the power supply from the smart battery for protecting the power supply and the smart battery.

In one option, the communication failure is found to occur when one of predetermined communication-failure conditions is met. The predetermined communication-failure conditions include: receiving no response from the smart battery within a first predetermined time-out duration after the charger requests the smart battery to respond.

In certain embodiments of the charging-control process, a plurality of message data is encrypted with a symmetric encryption key to form an encrypted plurality of message data. The symmetric encryption key is known to an individual authentic battery such that the encrypted plurality of message data is decodable by the smart battery if the smart battery is authentic. It allows the charger-side processor to determine whether the smart battery is authentic by detecting whether the smart battery is able to correctly respond to the encrypted plurality of message data. The encrypted plurality of message data is sent to the smart battery. The plurality of message data includes a request for the smart battery to respond. After the encrypted plurality of message data is sent to the smart battery, the charger-side processor monitors any response from the smart battery to determine whether the smart battery is authentic. Responsive to finding that the smart battery is not authentic, the charger-side processor switches off the charger-side on-off switch, whereby the smart battery is disallowed to connect to the power supply.

In one option, the smart battery is found to be not authentic when one of predetermined inauthenticity conditions is met. The predetermined inauthenticity conditions include: receiving no response from the smart battery within a second predetermined time-out duration after the encrypted plurality of message data is sent to the smart battery; and receiving a response from the smart battery, wherein the response incorrectly responds to the encrypted plurality of message data.

Preferably, the encrypted plurality of message data is sent to the smart battery at least when the charger is initially attached to the smart battery.

In certain embodiments of the charging-control process, the charger-side processor, upon receiving from the smart battery a request to stop charging, switches off the charger-side on-off switch for disconnecting the smart battery from the power supply.

The charger-side processor may be configured to communicate with the smart battery based on UART protocol. The charger-side on-off switch may be a MOSFET switch.

A second aspect of the present disclosure is to provide a smart battery rechargeable by an external charger.

The smart battery comprises an electrical cell, a battery-side on-off switch and a battery-side processor. The cell is rechargeable by the external charger. The battery-side on-off switch is used for electrically connecting or disconnecting the charger from the cell such that electrical power supplied by the charger is controllably receivable by the cell for charging. The battery-side processor is used for managing charging and discharging of the cell and for controlling the battery-side on-off switch. The battery-side processor is communicable with the charger and is configured to execute a battery-management process.

In certain embodiments of the battery-management process, a plurality of message data is received from the charger after the charger is initially attached to the smart battery. Before the charger is initially attached to the smart battery, the battery-side processor switches off the battery-side on-off switch so as to isolate the cell from the charger prior to establishing that the charger is authentic. After the plurality of message data is received, the battery-side processor decrypts the plurality of message data with a symmetric encryption key to form a decrypted plurality of message data. The symmetric encryption key is known to an individual authentic charger and is supposed to be used in generating the plurality of message data such that the decrypted plurality of message data is correctly decoded if the charger is authentic. The battery-side processor determines whether the decrypted plurality of message data is correctly decoded so as to determine whether the charger is authentic. Responsive to finding that the charger is authentic and that the decrypted plurality of message data includes a request to charge the cell, the battery-side processor switches on the battery-side on-off switch for allowing the charger to charge the cell unless at least one of predetermined no-charging conditions occurs.

The predetermined no-charging conditions may include: the cell being full; a permanent failure being occurred in the cell; and the cell being discharging.

In certain embodiments of the battery-management process, after the charger is found to be authentic and when at least one of the predetermined no-charging conditions occurs, the battery-side processor sends to the charger a request to stop charging as well as switching off the battery-side on-off switch for ensuring that the cell is disconnected from the charger even if the charger fails to stop charging the smart battery.

The battery-side processor may be configured to communicate with the charger based on UART protocol. The battery-side on-off switch may be a MOSFET switch.

The cell may be formed by a plurality of component cells that are serially connected. Furthermore, the cell may be a lithium-ion cell.

A third aspect of the present disclosure is to provide a battery charging system comprising a charger and a smart battery rechargeable by the charger.

The charger comprises a power supply, a charger-side on-off switch and a charger-side processor. The charger-side on-off switch is used for electrically connecting or disconnecting the power supply from the smart battery such that electrical power supplied by the power supply is controllably receivable by the smart battery for charging. The charger-side processor is used for controlling the charger-side on-off switch. The charger-side processor is communicable with the smart battery and is configured to execute a charging-control process.

The smart battery comprises an electrical cell, a battery-side on-off switch and a battery-side processor. The cell is rechargeable by the external charger. The battery-side on-off switch is used for electrically connecting or disconnecting the charger from the cell such that electrical power supplied by the charger is controllably receivable by the cell for charging. The battery-side processor is used for managing charging and discharging of the cell and for controlling the battery-side on-off switch. The battery-side processor is communicable with the charger and is configured to execute a battery-management process.

The charging-control process comprises: upon receiving from the smart battery a request to stop charging, switching off the charger-side on-off switch for disconnecting the smart battery from the power supply. The battery-management process comprises: when at least one of predetermined no-charging conditions occurs, sending the request to stop charging to the charger to ask the charger to disconnect the power supply from the smart battery as well as switching off the battery-side on-off switch for ensuring that the cell is disconnected from the power supply even if the charger fails to disconnect the power supply from the smart battery.

The charger and the smart battery may be implemented according to any of the respective embodiments disclosed in the first and second aspects of the present disclosure.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Other aspects of the present invention are disclosed as illustrated by the embodiments hereinafter.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The present disclosure provides a smart battery and a charger for charging the smart battery. A battery charging system is formed by including the smart battery and the charger. The charger and the smart battery are individually configured with a goal of enhancing safety in charging the smart battery. The charger and the smart battery are also configured to work together to enable the resultant battery charging system to enhance safety in smart battery charging.

Figure 1:
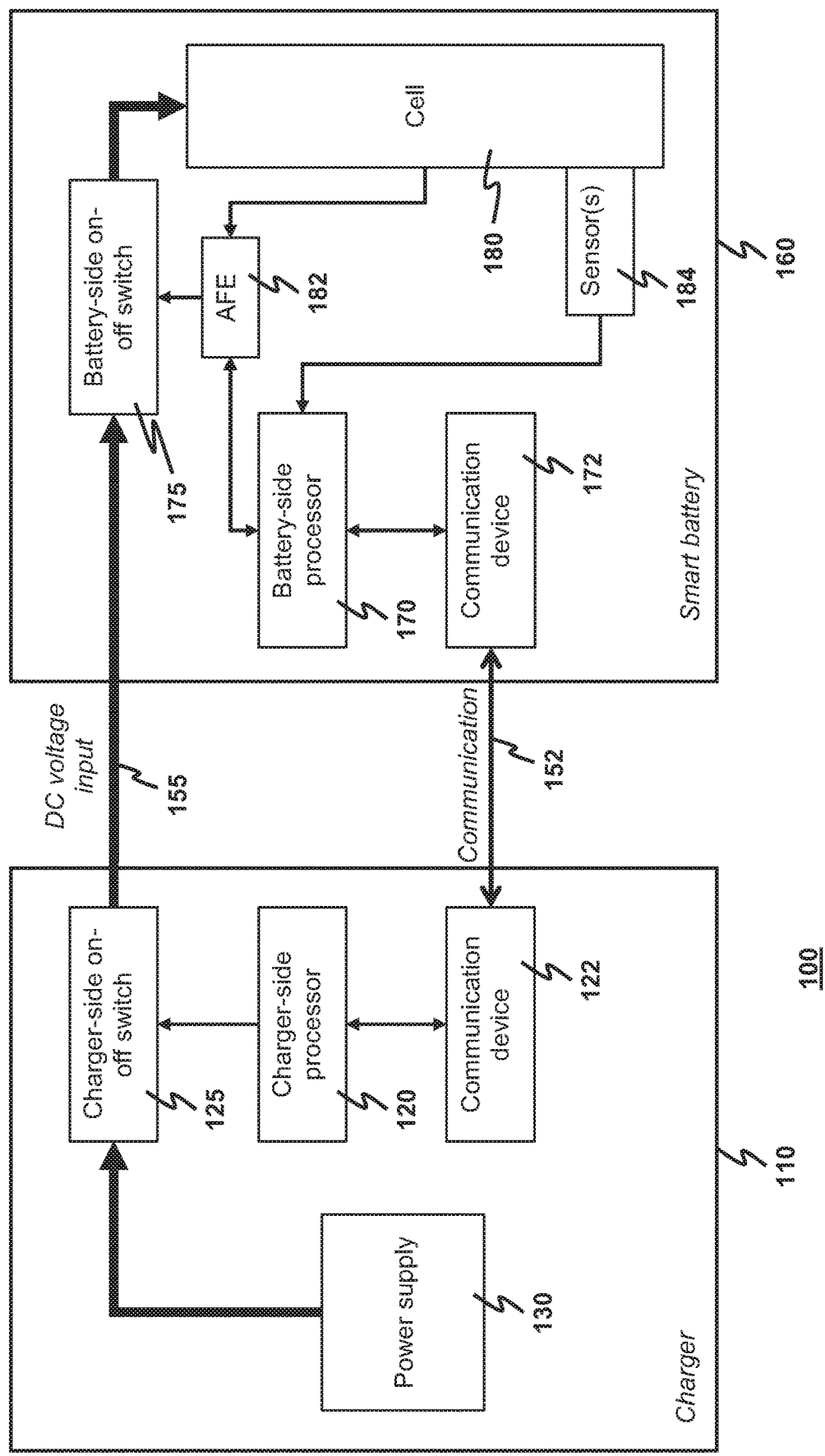
FIG. 1 depicts, in accordance with certain embodiments of the present disclosure, a smart battery and a charger used for charging an electrical cell in the smart battery, where the smart battery and the charger forms a battery charging system.

The present disclosure is exemplarily illustrated with the aid of FIG. 1. FIG. 1 depicts a battery charging system 100 comprising a charger 110 and a smart battery 160 in accordance with certain embodiments of the present disclosure.

Generally, the charger 110 and the smart battery 160 are formed as physically separate entities that are detachably attachable. Each of the charger 110 and the smart battery 160 is installed with electrical terminals such that when the charger 110 and the smart battery 160 are attached together, respective electrical terminals of the charger 110 and the smart battery 160 are contacted together to establish electrical connections. As a result of contacting together, a first electrical connection 155 and a second electrical connection 152 are established. The charger 110 is enabled to provide electrical power to the smart battery 160 through the first electrical connection 155 for charging the smart battery 160. In addition, the charger 110 and the smart battery 160 are communicable to each other for exchanging data related to charging. The second electrical connection 152 is used to enable communication between the charger 110 and the smart battery 160.

In the present disclosure, safety to charging the smart battery 160 is enhanced by the following measures.

To achieve safety during charging, the first electrical connection 155 is required to be securely established. The establishment of the first electrical connection 155 is correlated with the establishment of the second electrical connection 152. If the second electrical connection 152 breaks down, it is likely that the first electrical connection 155 also breaks down or is in an unstable condition. In case a communication failure occurs between the charger 110 and the smart battery 160, provision of electrical power from the charger 110 to the smart battery 160 should be stopped.

Safety is compromised if a counterfeit charger is used to charge the smart battery 160. Similarly, there is a safety issue if the charger 110 is used to charge a counterfeit battery. Therefore, the smart battery 160 needs to ensure that the charger 110 is an authentic one. Conversely, the charger 110 also needs to ensure that the smart battery 160 is an authentic one.

When the smart battery 160 detects that an abnormality indicating failure of an electrical cell 180 therein occurs, the smart battery 160 commands or requests the charger 110 to stop charging the smart battery 160. Accidentally, it is possible that the charger 110 does not respond to the command of stopping charging. Safety can be enhanced if the smart battery 160 itself can disable the connection between the charger 110 and the cell 180.

Details of the charger 110 and the smart battery 160 are elaborated as follows.

The charger 110 comprises a power supply 130, a charger-side on-off switch 125, a charger-side processor 120 and a charger-side communication device 122.

The power supply 130 is used to provide a DC voltage to charge the electrical cell 180 in the smart battery 160. The charger-side on-off switch 125 is used for electrically connecting or disconnecting the power supply 130 from the smart battery 160 such that electrical power supplied by the power supply 130 is controllably receivable by the smart battery 160 for charging the cell 180. The charger-side processor 120 is a computing processor used for controlling the charger-side on-off switch 125. The charger-side processor 120 is communicable with the smart battery 160 via the charger-side communication device 122 to exchange data with the smart battery 160. Furthermore, the charger-side processor 120 is configured to execute a charging-control process.

Figure 2:
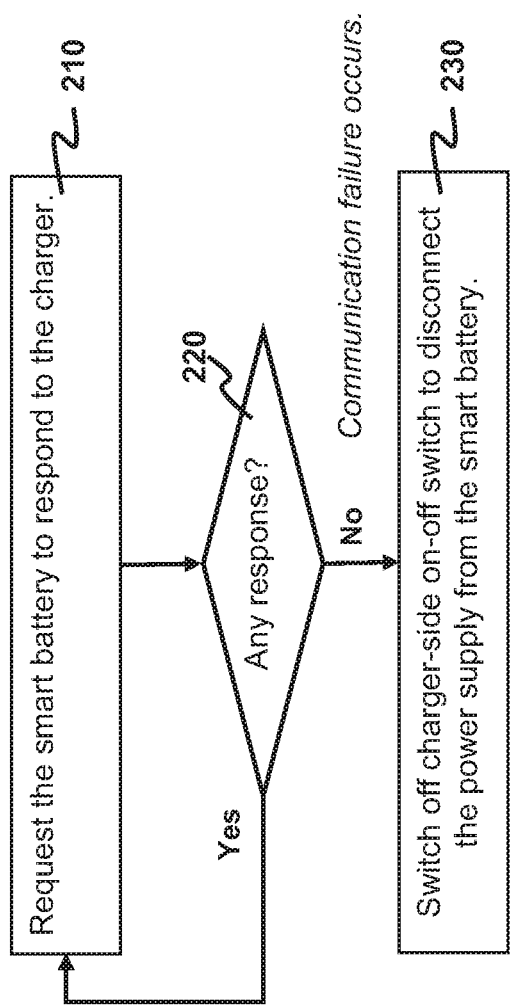
FIG. 2 depicts, in accordance with certain embodiments of the present disclosure, a flowchart for showing a first set of exemplary steps included in a charging-control process, where the charging-control process is executed by a charger-side processor of the charger, and the first set of exemplary steps is used for detecting if communication failure occurs.

FIG. 2 depicts a flowchart for showing a first set of exemplary steps advantageously and preferably included in the charging-control process in accordance with certain embodiments of the present disclosure. The aim of the first set of exemplary steps is to monitor the second electrical connection 152 such that a safety action of disconnecting the power supply 130 from the smart battery 160 is taken if a communication failure, which indicates a break-down of the second electrical connection 152, occurs.

In a step 210, the charger 110 requests the smart battery 160 to respond to the charger 110. The charger-side processor 120 then monitors if any response from the smart battery 160 is received.

In a step 220, the charger-side processor 120 check if there is any response is received. If it is found that a response is received, it indicates that the second electrical connection 152 is still intact. The step 210 is then repeated, immediately or after some time as determined appropriate by those skilled in the art according to practical situations. Hence, the smart battery 160 is regularly requested to respond to the charger 110 to continually monitoring the second electrical connection 152. If it is found that the smart battery 160 does not respond to the charger 110 after the charger 110 requests the smart battery 160 to respond, the charger-side processor 120 determines that a communication failure occurs.

In carrying out the step 220, usually a first predetermined time-out duration is set, e.g., $3s$. The charger-side processor 120 checks if there is any response received within the first predetermined time-out duration. The step 220 may be extended by identifying occurrence of the communication failure when one of predetermined communication-failure conditions is met. The predetermined communication-failure conditions include receiving no response from the smart battery 160 within the first predetermined time-out duration after the charger 110 requests the smart battery 160 to respond (the step 210). Other predetermined communication-failure conditions may include receiving an undecodable response within the first predetermined time-out duration.

After it is found in the step 220 that the communication failure occurs, the charger-side processor 120 switches off the charger-side on-off switch 125 (step 230). Consequently, the power supply 130 is disconnected from the smart battery 160 for protecting the power supply 130 and the smart battery 160 (or the cell 180).

Figure 3:
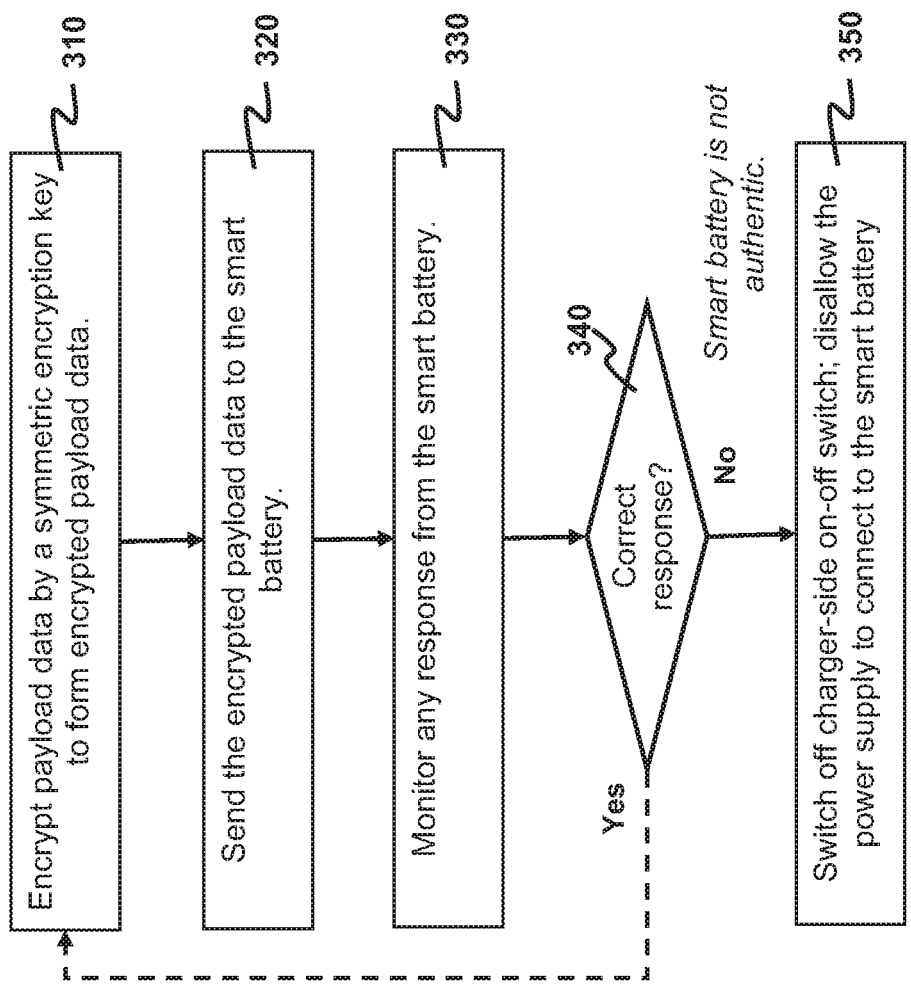
FIG. 3 depicts, in accordance with certain embodiments of the present disclosure, a flowchart for showing a second set of exemplary steps included in the charging-control process, where the second set of exemplary steps is used for detecting if the charger connects to a counterfeit battery.

FIG. 3 depicts a flowchart for showing a second set of exemplary steps advantageously and preferably included in the charging-control process in accordance with certain embodiments of the present disclosure. The aim of the second set of exemplary steps is to detect if the smart battery 160 is a counterfeit one (namely, a non-authentic battery). The charger 110 can then take action to disconnect the power supply 130 from the non-authentic battery.

There are two pre-agreed conditions that the charger 110 and an individual authentic battery follow such that the charger 110 can distinguish if a battery connected thereto is authentic or not. The pre-agreed conditions may be practically imposed, for example, by a manufacturer that manufactures the charger 110 and the individual authentic battery. The two pre-agreed conditions are listed as follows.

First, the charger 110 is communicable with the individual authentic battery for exchanging data under the same pre-agreed communication protocol. The communication protocol may specify, e.g., the packet format, the payload data format, the header format, the method of calculating checksum, the baud rate, etc.

Second, the charger 110 has a symmetric encryption key for encrypting data. The symmetric encryption key is also known to the individual authentic battery. In the charger 110 and the individual authentic battery, the symmetric encryption key is treated as a secret and is well protected from being read or retrieved by anyone or any device outside the charger 110 and the individual authentic battery. Symmetric encryption means that if a key is used for encrypting a data sequence, the encrypted data sequence can be decrypted to recover the original data sequence by using the same key. An example of symmetric encryption technique is the AES. Other symmetric encryption techniques may be found in the art, e.g., in M. U. BOKHARI and Q. M. SHALLAL, "A Review on Symmetric Key Encryption Techniques in Cryptography," *International Journal of Computer Applications*, vol. 147, no. 10, pp. 43-48, August 2016, the disclosure of which is incorporated by reference herein.

In explaining the second set of exemplary steps used for the charging-control process, consider a specific case that the charger 110 has not established the authenticity of the smart battery 160.

In a step 310, the charger-side processor 120 encrypts a plurality of message data based on the symmetric encryption key to form an encrypted plurality of message data. The plurality of message data is generated according to the pre-agreed communication protocol, and contains a message that is meaningful to and understandable by the smart battery 160.

In a step 320, the encrypted plurality of message data is sent to the smart battery 160 over the second electrical connection 152 (functioned as a communication channel) according to the pre-agreed communication protocol. In particular, the plurality of message data includes a request for the smart battery 160 to respond. If a battery under consideration is authentic, the encrypted plurality of message data is decodable by this battery, thereby enabling the battery under consideration to respond correctly. It allows the charger-side processor 120 to determine whether the smart battery 160 is authentic by detecting whether the smart battery 160 is able to correctly respond to the encrypted plurality of message data.

In a step 330, the charger-side processor 120 monitors any response from the smart battery 160 to determine whether this battery is authentic. If it is found that a correct response is received, the smart battery 160 is deemed to be authentic (step 340). In a first option, the step 310 is repeated, immediately or after some time as determined appropriate by those skilled in the art according to practical situations. Hence, the smart battery 160 is regularly requested to respond to the charger 110. In a second option, the step 310 is not done because the smart battery 160 has already been found to be authentic. However, the first option has an advantage in data security because the communication between the charger 110 and the smart battery 160 is encrypted. It hinders an adversary from reverse-engineering the charger 110 or the smart battery 160 and then developing a counterfeit version thereof. If in the step 340 it is found that the smart battery 160 does not respond to the charger 110 or provides an incorrect response, the smart battery 160 is deemed to be non-authentic.

In carrying out the step 340, usually a second predetermined time-out duration is set, e.g., 5 s. The charger-side processor 120 checks if there is any correct response received within the second predetermined time-out duration. The step 340 may be extended by identifying that the smart battery 160 is not authentic when one of predetermined inauthenticity conditions is met. The predetermined inauthenticity conditions include receiving no response from the smart battery 160 within the second predetermined time-out duration after the encrypted plurality of message data is sent to the smart battery 160. Other predetermined inauthenticity conditions may include receiving a response from the smart battery 160 but the response incorrectly responds to the encrypted plurality of message data.

After finding that the smart battery 160 is not authentic in the step 340, the charger-side processor 120 switches off the charger-side on-off switch 125 in a step 350. The smart battery 160 is disallowed to connect to the power supply 130.

Note that when the charger 110 is initially attached to the smart battery 160, the charger 110 is uncertain whether the smart battery 160 is authentic or not. It is highly preferable that the encrypted plurality of message data is sent to the smart battery 160 at least when the charger 110 is initially attached to the smart battery 160.

Refer to FIG. 1. The smart battery 160 comprises the cell 180 that is rechargeable, a battery-side on-off switch 175, a battery-side processor 170, and a battery-side communication device 172. The smart battery 160 may further comprise an AFE 182, and one or more sensors 184.

The battery-side on-off switch 175 is used for electrically connecting or disconnecting the charger 110 from the cell 180 such that electrical power supplied by the power supply 130 of the charger 110 is controllably receivable by the cell 180 for charging. The battery-side processor 170 is a computing processor used for managing charging and discharging of the cell 180 and for controlling the battery-side on-off switch 175. The battery-side processor 170 is communicable with the charger 110 via the battery-side communication device 172 to exchange data with the charger 110. Specifically, the battery-side processor 170 is configured to communicate with the charger-side processor 120 via the battery-side communication device 172 and the charger-side communication device 122 over the second electrical connection 152, which forms a communication channel between the smart battery 160 and the charger 110. The battery-side processor 170 is configured to execute a battery-management process.

The AFE 182, if installed in the smart battery 160, is advantageously used to provide an analog signal having sufficient power to drive the battery-side on-off switch 175 to rapidly switch on or off. The one or more sensors 184 are used to measure operating parameters of the smart battery 160 so as to enable the battery-side processor 170 to monitor the health of the smart battery 160 and, in particular, the cell 180. These parameters may include: an amount of electrical current delivered from the cell 180 to a power load during discharging; a voltage output of the cell 180; an instantaneous temperature of the cell 180; and an amount of current received by the cell 180 during charging. Other operation parameters may also be measured. Note that the battery-side processor 170, the battery-side communication device 172 and the one or more sensors 184 forms a BMS.

Figure 4:
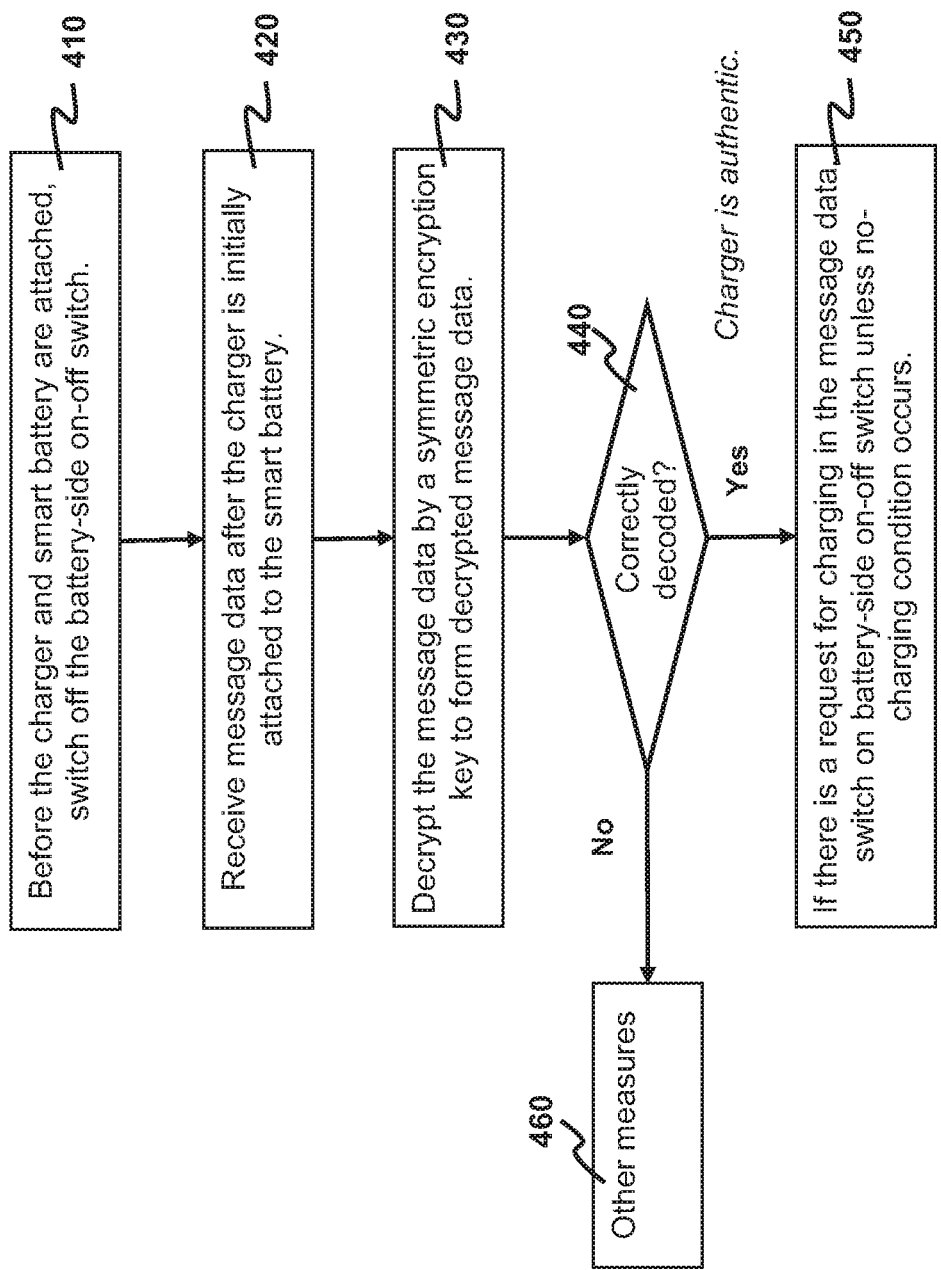
FIG. 4 depicts, in accordance with certain embodiments of the present disclosure, a flowchart for showing a first set of exemplary steps included in a battery-management process, where the battery-management process is executed by a battery-side processor of the smart battery, and the first set of exemplary steps is used for detecting if the smart battery connects to an authentic charger.

FIG. 4 depicts a flowchart for showing a first set of exemplary steps advantageously and preferably included in the battery-management process in accordance with certain embodiments of the present disclosure. The aim of the first set of exemplary steps is to detect if the charger 110 is a counterfeit one (namely, a non-authentic charger). The smart battery 160 can then take action to disconnect the cell 180 from the non-authentic charger.

In explaining the first set of exemplary steps used for the battery-management process, consider a specific case that the smart battery 160 has not established the authenticity of the charger 110.

Before the charger 110 is initially attached to, e.g., plugged to, the smart battery 160, the battery-side processor 170 switches off the battery-side on-off switch 175 in a step 410. As a result, the cell 180 is isolated from the charger 110 prior to establishing that the charger 110 is authentic.

After the charger 110 is attached to the smart battery 160, it is possible that the charger 110 asks the smart battery 160 for battery status. It is also possible that the charger 110 requests the smart battery 160 to permit charging the cell 180. Other possibilities are possible. In general, the charger 110 sends a plurality of message data to the smart battery 160. If the charger 110 is authentic, the plurality of message data is generated by encrypting an original plurality of message data with a symmetric encryption key. The symmetric encryption key is known to an individual authentic charger and is supposed to be used in generating the plurality of message data. The symmetric encryption key is also known to the smart battery 160. Similar to what is mentioned above, the symmetric encryption key is treated as a secret and is well protected from being read or retrieved by anyone or any device outside the smart battery 160 and the individual authentic charger. Therefore, if the smart battery 160 can correctly decode the plurality of message data by decrypting this plurality of message data with the symmetric encryption key, the charger 110 is deemed to be authentic. Otherwise, the charger 110 is deemed not authentic. Checking whether the plurality of message data after decryption is the original plurality of message data is practically feasible by, e.g., including a checksum value in the original plurality of message data. If the plurality of message data after decryption has the message body and the checksum value not matched, the plurality of message data after decryption is deemed to be incorrectly decoded.

In a step 420, the smart battery 160, or actually the battery-side processor 170, receives the plurality of message data from the charger 110. The received plurality of message data is then decrypted with the symmetric encryption key to form a decrypted plurality of message data in a step 430. In a step 440, the battery-side processor 170 determines whether the decrypted plurality of message data is correctly decoded so as to determine whether the charger is authentic.

If in the step 420 it is found that the charger 110 is authentic and that the decrypted plurality of message data includes a request to charge the cell 180, a step 450 is performed. In the step 450, the battery-side processor 170 switches on the battery-side on-off switch 175, possibly via the AFE 182, for allowing the charger 110 to charge the cell 180 unless at least one of predetermined no-charging conditions occurs.

The predetermined no-charging conditions are conditions that charging the cell 180 should be prohibited. Examples of the predetermined no-charging conditions include: the cell 180 being full; a permanent failure being occurred in the cell 180; and the cell 180 being discharging, e.g., in providing a current to a power tool.

If in the step 420 it is found that the charger 110 is not authentic, the battery-side on-off switch 175 continues to be in the off state. Furthermore, other measures 460 may be performed. For example, the battery-side processor 170 disconnects communication with the charger 110.

Consider again the situation that the charger 110 is attached to the smart battery 160. In particular, consider the specific case that the smart battery 160 and the charger 110 are mutually authenticated. That is, the smart battery 160 has found that the charger 110 is an authentic charger, and the charger 110 has also found that the smart battery 160 is an authentic battery. The smart battery 160 and the charger 110 form the battery charging system 100, and cooperate together in charging the cell 180.

Figure 5:
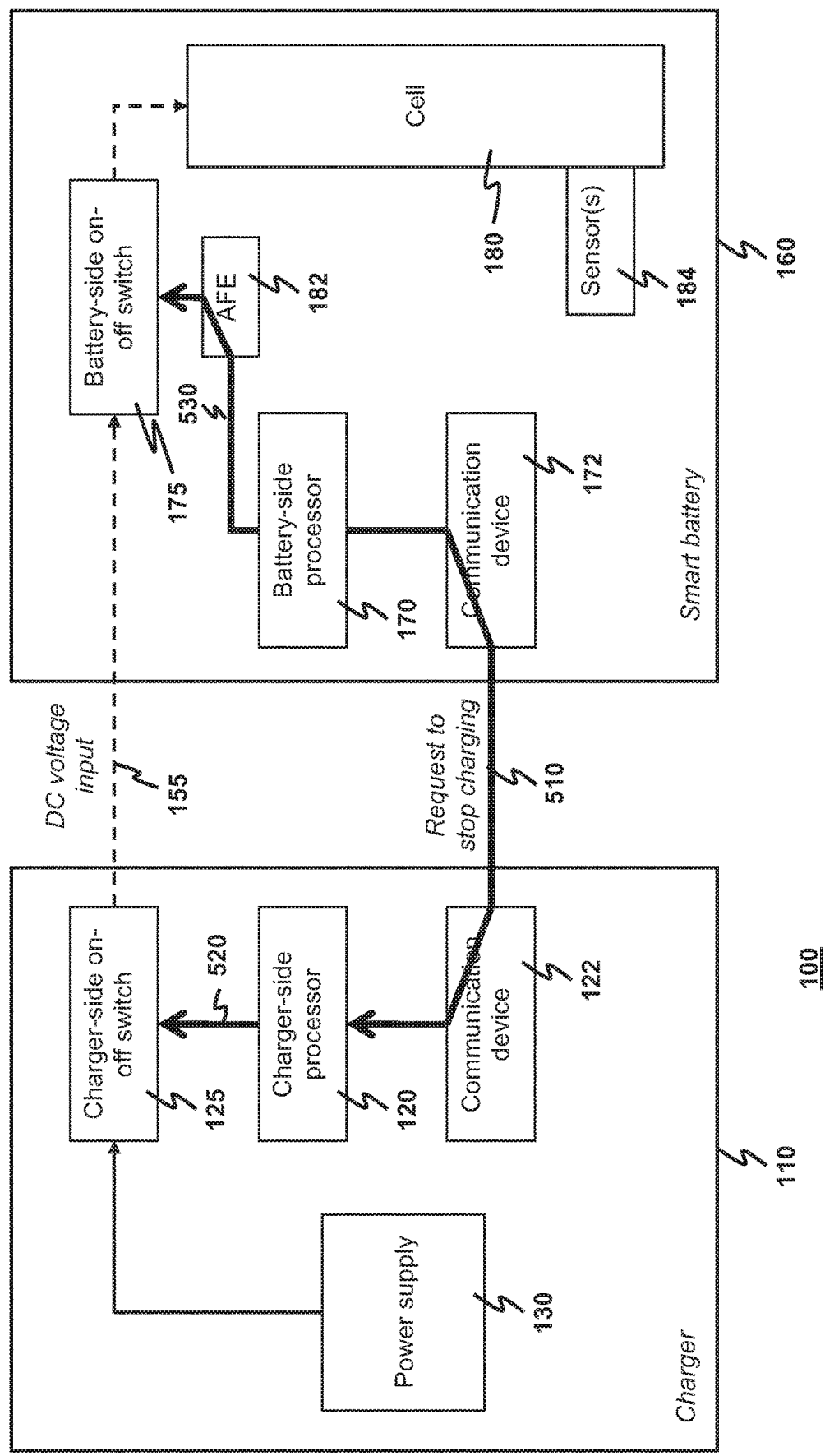
FIG. 5 depicts, in accordance with certain embodiments of the present disclosure, operations taken by the smart battery and the charger to stop charging the cell after an abnormal condition is found.

When an abnormal condition of the cell 180 occurs, such as the temperature of the cell 180 as measured by a temperature sensor among the one or more sensors 184 exceeding a predetermined safety limit, it is advantageous that both the charger 110 and the smart battery 160 work together to ensure that charging to the cell 180 can be reliably stopped. The cooperation between the charger 110 and the smart battery 160 is illustrated as follows with the aid of FIG. 5. FIG. 5 depicts, in accordance with certain embodiments of the present disclosure, operations taken by the smart battery 160 and the charger 110 to stop charging the cell 180 after occurrence of the abnormal condition.

The operations are performed by the smart battery 160 and the charger 110 through executing the battery-management process and the charging-control process, respectively. When at least one of the predetermined no-charging conditions occurs, the battery-side processor 170 sends a request to stop charging to the charger-side processor 120 of the charger 110 so as to ask the charger 110 to disconnect the power supply 130 from the smart battery 160 (as indicated by communication path 510). Upon receiving from the smart battery 160 the request to stop charging, the charger-side processor 120 switches off the charger-side on-off switch 125 for disconnecting the smart battery 160 from the power supply 130 (as indicated by communication path 520). In addition, advantageously the battery-side processor 170 switches off the battery-side on-off switch 175 for ensuring that the cell 180 is disconnected from the power supply 130 even if the charger 110 fails to disconnect the power supply 130 from the smart battery 160 (as indicated by communication path 530). Thereby, double protection is achieved.

Other implementation details of the charger 110 and the smart battery 160 are provided as follows.

Regarding the power supply 130, it usually draws AC power from the mains and converts the AC power into DC power for delivering to the smart battery 160. A switching-mode power supply is usually used for realizing the power supply 130.

Practically, the charger-side on-off switch 125 and the battery-side on-off switch 175 are solid-state switches realized as MOSFET switches. Since a high current is usually required to be handled by the charger-side on-off switch 125 and the battery-side on-off switch 175, power MOSFETs are most often used in realizing these switches 125, 175. Alternatively, electromechanical switches may be used although the electromechanical switches are less preferable than the MOSFET switches in many practical situations.

The charger-side processor 120 may be implemented as a general processor, a microprocessor or a microcontroller. The charger-side processor 120 may be used with one or more data storages, such as a solid-state memory or a FLASH memory, for storing data and program instructions. The charger-side communication device 122 is configured to communicate with an external device based on a certain communication protocol, e.g., the UART protocol. The charger-side processor 120 and the charger-side communication device 122 may be realized as two separate ICs. It is also possible that the charger-side processor 120 and the charger-side communication device 122 are integrated into one IC.

Implementation details of the battery-side processor 170 and of the battery-side communication device 172 are similar to those of the charger-side processor 120 and of the charger-side communication device 122, respectively.

The electrical cell 180 may be formed by a plurality of component cells that are serially connected such that the cell 180 provides an output voltage, e.g., 40V, not providable by a single component cell. Furthermore, the cell 180 may be a lithium-ion cell.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of steps and method of operation described in the exemplary embodiment without departing from the scope of the invention as set forth in the appended claims.

What is claimed is:

1. A charger for charging a smart battery comprising:
   a power supply;
   a charger-side on-off switch for electrically connecting or disconnecting the power supply from the smart battery such that electrical power supplied by the power supply is controllably receivable by the smart battery for charging; and
   a charger-side processor for controlling the charger-side on-off switch, the charger-side processor being communicable with the smart battery and being configured to execute a charging-control process;
   wherein the charging-control process comprises:
   regularly requesting the smart battery to respond to the charger;
   responsive to determining that the smart battery does not respond to the charger after the charger requests the smart battery to respond, determining that a communication failure occurs; and
   responsive to finding that the communication failure occurs, switching off the charger-side on-off switch so as to disconnect the power supply from the smart battery for protecting the power supply and the smart battery; and
   wherein the communication failure is found to occur when one of predetermined communication-failure conditions is met, the predetermined communication-failure conditions including:
   receiving no response from the smart battery within a first predetermined time-out duration after the charger requests the smart battery to respond; and
   receiving no response from the smart battery within a second predetermined time-out duration following the first predetermined time-out period after the encrypted plurality of message data is sent to the smart battery.

2. The charger of claim 1, wherein the charging-control process further comprises: encrypting a plurality of message data with a symmetric encryption key to form an
   encrypted plurality of message data, wherein the symmetric encryption key is known to an individual authentic battery such that the encrypted plurality of message data is decodable by the smart battery if the smart battery is authentic, allowing the charger-side processor to determine whether the smart battery is authentic by detecting whether the smart battery is able to correctly respond to the encrypted plurality of message data;
   sending the encrypted plurality of message data to the smart battery, wherein the plurality of message data includes a request for the smart battery to respond;
   monitoring any response from the smart battery to determine whether the smart battery is authentic; and
   responsive to finding that the smart battery is not authentic, switching off the charger-side on-off switch, whereby the smart battery is disallowed to connect to the power supply.

3. The charger of claim 2, wherein the smart battery is found to be not authentic when one of predetermined inauthenticity conditions is met, the predetermined inauthenticity conditions including:
   receiving a response from the smart battery, wherein the response incorrectly responds to the encrypted plurality of message data.

4. The charger of claim 2, wherein the encrypted plurality of message data is sent to the smart battery at least when the charger is initially attached to the smart battery.

5. The charger of claim 1,
wherein the second predetermined time-out duration is different from the first predetermined time-out duration.

6. The charger of claim 1, wherein the charger-side processor is configured to communicate with the smart battery based on Universal Asynchronous Receiver-Transmitter (UART) protocol.

7. The charger of claim 1, wherein the charger-side on-off switch is a metal-oxide-semiconductor field-effect transistor (MOSFET) switch.

8. The charger of claim 1, wherein the charging-control process further comprises:
upon receiving from the smart battery a request to stop charging, switching off the charger-side on-off switch for disconnecting the smart battery from the power supply.

9. A battery charging system comprising:
a smart battery; and
the charger of claim 1; wherein:
the smart battery comprises:
an electrical cell that is rechargeable;
a battery-side on-off switch for electrically connecting or disconnecting the charger from the cell such that the electrical power supplied by the power supply is controllably receivable by the cell for charging; and
a battery-side processor for managing charging and discharging of the cell and for controlling the battery-side on-off switch, the battery-side processor being configured to execute a battery-management process,
and
the battery-management process comprises:
when at least one of predetermined no-charging conditions occurs, sending the request to stop charging to the charger to ask the charger to disconnect the power supply from the smart battery as well as switching off the battery-side on-off switch for ensuring that the cell is disconnected from the power supply even if the charger fails to disconnect the power supply from the smart battery.

10. The battery charging system of claim 9, wherein the predetermined no-charging conditions include:
the cell being full;
a permanent failure being occurred in the cell; and
the cell being discharging.

11. The battery charging system of claim 9, wherein the battery-management process further comprises:
receiving a plurality of message data from the charger after the charger is initially attached to the smart battery;
before the charger is initially attached to the smart battery, switching off the battery-side on-off switch so as to isolate the cell from the charger prior to establishing that the charger is authentic;
decrypting the plurality of message data with a symmetric encryption key to fom1 a decrypted plurality of message data, wherein the symmetric encryption key is known to an individual authentic charger and is supposed to be used in generating the plurality of message data such that the decrypted plurality of message data is correctly decoded if the charger is authentic;
determining whether the decrypted plurality of message data is correctly decoded so as to determine whether the charger is authentic; and
responsive to finding that the charger is authentic and that the decrypted plurality of message data includes a request to charge the cell, switching on the battery-side on-off switch for allowing the charger to charge the cell unless at least one of the predetermined no-charging conditions occurs.

12. The battery charging system of claim 9, wherein the battery-side processor is configured to communicate with the charger based on Universal Asynchronous Receiver-Transmitter (UART) protocol.

13. The battery charging system of claim 9, wherein the battery-side on-off switch is a metal-oxide-semiconductor field-effect transistor (MOSFET) switch.

14. The battery charging system of claim 9, wherein the cell is formed by a plurality of component cells that are serially connected.

15. A smart battery comprising:
an electrical cell rechargeable by an external charger;
a battery-side on-off switch for electrically connecting or disconnecting the charger from the cell such that electrical power supplied by the charger is controllably receivable by the cell for charging; and
a battery-side processor for managing charging and discharging of the cell and for controlling the battery-side on-off switch, the battery-side processor being communicable with the charger and being configured to execute a battery-management process;
wherein the battery-management process comprises:
after the charger is found to be authentic and when at least one of the predetermined no-charging conditions occurs, sending to the charger a request to stop charging as well as switching off the battery-side on-off switch for ensuring that the cell is disconnected from the charger even if the charger fails to stop charging the smart battery.

16. The smart battery of claim 15, wherein the predetermined no-charging conditions include:
the cell being full;
a permanent failure being occurred in the cell; and
the cell being discharging.

17. The smart battery of claim 15, wherein the battery-management process further comprises:
receiving a plurality of message data from the charger after the charger is initially attached to the smart battery;
before the charger is initially attached to the smart battery, switching off the battery-side on-off switch so as to isolate the cell from the charger prior to establishing that the charger is authentic;
decrypting the plurality of message data with a symmetric encryption key to form a decrypted plurality of message data, wherein the symmetric encryption key is known to an individual authentic charger and is supposed to be used in generating the plurality of message data such that the decrypted plurality of message data is correctly decoded if the charger is authentic;
determining whether the decrypted plurality of message data is correctly decoded so as to determine whether the charger is authentic; and
responsive to finding that the charger is authentic and that the decrypted plurality of message data includes a request to charge the cell, switching on the battery-side on-off switch for allowing the charger to charge the cell unless at least one of the predetermined no-charging conditions occurs.

18. The smart battery of claim 15, wherein the battery-side processor is configured to communicate with the charger based on Universal Asynchronous Receiver-Transmitter (UART) protocol.

19. The smart battery of claim 15, wherein the battery-side on-off switch is a metal-oxide-semiconductor field-effect transistor (MOSFET) switch.

20. The smart battery of claim 15, wherein the cell is formed by a plurality of component cells that are serially connected.

21. The smart battery of claim 15, wherein the cell is a lithium-ion cell.

* * * * *